Patented Feb. 29, 1944

2,342,990

UNITED STATES PATENT OFFICE 2,342,990

PROCESS FOR SEPARATING HYDROCARBONS

Charles E. Welling, Bartlesville, Okla., assignor to Phillips Petroleum Company, a corporation of Delaware No Drawing. Application April 6, 1942,
Serial No. 437,906

8 Claims. (Cl. 260—677)

This invention relates to the separation of liquid mixtures of olefin hydrocarbons. More particularly, this invention relates to the selective extraction of one or more isomeric olefins from a liquid mixture of close-boiling isomeric olefins, utilizing a selective solvent in which certain olefins have greater solubility than other isomeric olefins.

Large quantities of olefinic hydrocarbons are produced in various industrial processes. In general, these olefins when concentrated by known means are found to be mixtures of close-boiling structural isomers. However, it often happens that such a mixture of isomeric olefins is undesirable for special uses, such as used for chemical syntheses, and in such cases, the known methods of separation of olefinic hydrocarbons are apt to be inadequate or impractical from the economic standpoint.

The difficulties encountered in separating mixtures of certain isomeric olefins by fractional distillation, for instance, are readily perceived from consideration of the small differences in boiling points that frequently exist. Thus, in the case of the butenes, the following pair of compounds of almost identical boiling points is found:

| Compound | Boiling point |
|---|---|
| | °F. |
| Isobutene | 19.2 |
| Butene-1 | 20.7 |

When the isomeric pentenes are considered, much the same situation is found as is shown:

| Compound | Boiling point |
|---|---|
| | °F. |
| Pentene-1 | 86.2 |
| 2-methyl-1-butene | 87.9 |
| Pentene-2 (low-boiling geometrical isomer) | 96.6 |
| Pentene-2 (high-boiling geometrical isomer) | 98.6 |
| 2-methyl-2-butene | 101.5 |

The number of isomeric olefins is found to increase, and boiling point differences in general decrease, as hexenes and higher members of the homologous series are considered.

My invention is a process for the separation of structurally isomeric olefins one from another by contacting a liquid olefinic mixture with a selective solvent, specifically liquid ammonia, under controlled conditions of temperature and pressure such that two liquid phases exist. Liquid ammonia has been proposed for use as a selective solvent for the separation of olefins from paraffins. However, my invention is not concerned with this separation, but with the hitherto unknown separation of one isomeric olefin from another. I have now found that under conditions such that two liquid phases exist, the different structural isomers quite unexpectedly exhibit differing solubilities in the ammonia phase, the more branched olefins being generally more soluble than the less branched olefins. The term less branched olefins as used herein may include straight chain olefins. Hence, after equilibrium has been established, the phases may be separated, and ammonia and hydrocarbons may be recovered from each phase, whereby a more or less complete segregation of the olefins, based upon structure, is brought about.

Such segregation is, however, never complete in a single batch liquid-liquid contacting since a portion of the more soluble or branched chain olefin remains in the hydrocarbon phase while at the same time, a part of the less soluble or straight chain olefin passes into solution in the ammonia phase. In order to attain greater segregation of the components of the hydrocarbon charge, the batch process may be repeated as many times as desired. This separation, which is incomplete in a single batch extraction, may be made complete if desired, by the use of an extraction apparatus which may be packed or fitted with liquid distributing devices for bringing about, in known fashion, continuous countercurrent contacting of selective solvent and hydrocarbon mixture to be treated. Although countercurrent contacting is preferred as being most efficacious, it is, of course, apparent that any other method or apparatus for intimately contacting two liquid phases under controlled conditions of temperature and pressure may be employed.

In practicing my process, it is necessary to operate at a temperature sufficiently low that two liquid phases can exist, but it is usually preferable to operate at temperatures substantially, say some 10 to 100° F., lower than the point of complete miscibility. In case mixtures of butenes or of pentenes are to be treated, the maximum temperature that may be employed when essentially anhydrous ammonia is used as solvent is somewhat above 75° F.; when olefinic mixtures of higher molecular weight are to be treated, somewhat higher temperatures may be used if desired. In general, the solvent will be found to exhibit greater solubility for hydrocarbons as the temperature is increased, but at the same time, the selectivity of the solvent will decrease. It is necessary to carry out the extraction at a pressure that is equal to, or greater than, the vapor pressure exerted by the liquids being contacted.

In practicing my invention, I may employ any known method to recover ammonia from the extract and raffinate phases as, for instance, water washing, chemical absorption, distillation, etc. The ammonia so separated may be reused in the process.

As will be apparent to one skilled in the art, the relative volumes to be employed of solvent and of the hydrocarbon mixture to be treated will depend upon such factors as the composition of the specific hydrocarbon mixture, the temperature to be employed, the solubility of the hydrocarbons in the solvent phase and of the solvent in the hydrocarbon phase, and the degree of separation of the isomeric hydrocarbons that is desired. Without limiting myself thereto, I may state that ordinarily suitable ratios of solvent to hydrocarbon charge will range from approximately 1:1 to 10:1.

I have found that I may employ my process in effecting the separation of isomeric olefins in mixtures containing the same even when hydrocarbons of other types, such as paraffins and naphthenes, are present in the mixtures.

I have further found that certain advantages may sometimes be realized by the addition of a hydrocarbon material of substantially different boiling point to the particular mixture of isomeric olefins that is to be treated. Thus, for instance, the liquid densities of pentenes and ammonia are nearly the same, so that phase separations become somewhat more difficult than would otherwise be the case; however, since the pentenes will, in general, be of slightly higher density than the ammonia, it is possible to enhance the difference in densities and hence the ease of phase separation by adding a high-boiling pure or mixed hydrocarbon of still higher density to the pentenes before extraction. While the high-boiling hydrocarbon, such as mineral seal oil, that is so added will tend to distribute itself between raffinate and extract and may have to be recovered from each phase, yet such recovery is not difficult since a wide difference in boiling points exists. The added hydrocarbon of different boiling point is frequently paraffinic, but may also be of other type such as olefinic, naphthenic, aromatic, etc., or of mixed type.

When a mixture of isomeric butenes is treated according to my process, it is found that incremental additions of a high-boiling hydrocarbon will serve to reduce for a time, rather than increase, the difference in densities of the phases, since butenes are of somewhat lower density than ammonia. It is evident therefore that a certain range of concentrations of added high-boiling hydrocarbons would cause the hydrocarbon and ammonia phases to have nearly identical, or identical, densities, and such a range of concentrations should be avoided. Accordingly, I use sufficient added high-boiling hydrocarbon to give a mixture with butenes having a density considerably higher than this range. Or, I have found it advantageous to add a lower-boiling hydrocarbon such as propane to a mixture of isomeric butenes in order to decrease the density thereof sufficiently to improve considerably the phase separation between hydrocarbon-rich phase and ammonia-rich phase; I may, however, added low-boiling hydrocarbon. In any case, ordinary fractionation serves readily to separate the added lower-boiling or higher-boiling hydrocarbon from the treated olefins.

Another advantage that may be realized by the addition of a high-boiling hydrocarbon to a mixture of isomeric olefins to be treated results from the reduction of the solubility of the ammonia in the hydrocarbon phase, so that the recovery of ammonia from the treated hydrocarbon phase becomes easier. This may be of considerable economic importance, since the hydrocarbon-rich phase generally contains relatively large proportions of ammonia. The addition of high-boiling hydrocarbon may in this manner to a certain extent at least act as a substitute for lowered temperatures, and thus sometimes effect substantial refrigeration economies. If one desires to operate at a temperature near to or above the temperature of complete miscibility between the isomeric olefins and ammonia, a higher-boiling hydrocarbon may be added in amount sufficient to cause the existence of two liquid phases at said temperature.

In order further to illustrate my invention, I may mention two practical applications which are indicative of the present interest in a process capable of effecting the separation of isomeric olefins in concentrated or pure form. However, these applications are not to be taken as limiting in any way the scope of my invention. One application consists in treating a close-cut fraction comprising isobutene and butene-1 in accordance with this invention in order to effect separation of the butene mixture into a raffinate rich in butene-1 and an extract rich in isobutene. The butene-1 concentrate so produced is then of greater value as a feed stock for a succeeding process, such as the production of butadiene by dehydrogenation, than the original mixture, which contained also isobutene. At the same time, a further advantage results, in that the isobutene concentrate so produced is well adapted for use in processes such as catalytic polymerization or in certain catalytic alkylation processes, and a higher octane number gasoline can be produced than if the original butene mixture is used as a feed stock.

A second application of my process consists in treating a $C_7$—$C_8$ fraction of cracked gasoline in order to produce a raffinate that is rich in straight chain olefins and an extract rich in branched chain olefins. The extract then may be hydrogenated in order to produce a stable gasoline rich in branched chain heptanes and octanes and having a higher octane number than the original mixture would have after hydrogenation, while the raffinate may be subjected to catalytic cracking or isomerization to increase its value.

In order to show the efficacy of my process in separating hydrocarbon mixtures of the character indicated above, the following examples are cited, but it is to be understood that the invention is not limited thereto.

*Example I*

In batch-wise fashion, a mixture containing the isomeric olefins isobutene and butene-1 was contacted with liquid anhydrous ammonia until equilibrium was established; then the phases were separated, and analyses made of each phase. The contacting was carried out at a temperavapor pressure. The compositions of the phases were as shown below:

| Component | Hydrocarbon-rich phase | Ammonia-rich phase |
|---|---|---|
| Ammonia (mole per cent) | 44 | 95.1 |
| Isobutene (mole per cent on NH₃-free basis) | 44.2 | 50.5 |
| Butene-1 (mole per cent on NH₃-free basis) | 52.9 | 48.0 |
| Saturated hydrocarbon (mole per cent on NH₃-free basis) | 2.9 | 1.5 |

It is seen that in a single contacting, an extract was obtained that had been considerably enriched in isobutene. By a series of contactings, or by a continuous countercurrent extraction, a more complete separation of the isomeric olefins may readily be obtained.

Example II

In batch-wise fashion, a mixture containing the isomeric olefins pentene-2 and 2-methyl-2-butene was contacted with liquid ammonia until equilbrium was established; then the phases were separated, and analyses made of each phase. The contacting was carried out at a temperature of 40° F. and under the vapor pressure of the system. Upon analysis, the ammonia-rich phase was found to contain about 5 volume per cent hydrocarbons, and the hydrocarbon-rich phase contained about 31 volume per cent ammonia. Compositions on an ammonia-free basis of the hydrocarbons recovered from the two phases are shown below:

| Component | Hydrocarbon-rich phase | Ammonia-rich phase |
|---|---|---|
| 2-methyl-2-butene (mole per cent) | 48.9 | 56.2 |
| Pentene-2 | 47.6 | 43.7 |
| Unidentified hydrocarbons (largely saturates) | 3.5 | 0.1 |

It is seen that in a single contacting, an extract was obtained that had been considerably enriched in the branched chain olefin, 2-methyl-2-butene. By a series of contactings, a more complete separation of the isomeric olefins is easily obtained.

Example III

A C₅ fraction obtained from the effluents of a hydrocarbon cracking process is subjected to further fractionation to separate out a narrow-boiling-range cut of lower-boiling pentenes and isopentane. This cut is distilled using methyl formate as an entraining agent whereby a separation between the isopentane and the pentenes is accomplished. The pentene fraction so obtained is 95 per cent or more unsaturated and is composed almost entirely of pentene-1 and 2-methyl-1-butene. To this fraction $$\left(\text{sp. gr.}\frac{60° F.}{60° F.} = 0.648\right)$$

is added a high boiling asborber oil having the following properties:

Sp. gr. $\frac{60° F.}{60° F.}$ _____ 0.824
Molecular weight _____ 192
Boiling range, °F _____ 453–555

This absorber oil is added in proportions of about one part oil to three parts pentenes to give a mixture having a specific gravity at 60° F. of 0.693. The resulting mixture, containing pentenes and having a considerably increased density, is continuously passed countercurrently to a stream of liquid anhydrous ammonia through a packed tower at a temperature of 60° F. The pressure is maintained at 100 pounds per square inch gage in order to maintain liquid phase conditions during the contacting. An ammonia-rich phase is removed from the top of the tower and a hydrocarbon-rich phase from the bottom. Each of these phases is passed to a separate settling zone to separate small amounts of the other phase which have been entrained. The major portion of ammonia is then removed from each phase by a fractionation process followed by water-washing of the hydrocarbon products. The recovered ammonia is recycled. The hydrocarbon material thus obtained from each phase is passed into separate small fractionating columns having fifteen trays, wherein the pentenes are readily stripped from the absorber oil. The oil from the kettle of each column is combined and re-used by mixing with fresh mixed pentene charge stock. The pentenes, or extract, which are finally obtained in this manner from the ammonia-rich phase are predominately 2-methyl-1-butene, while the pentenes, or raffinate, obtained from the hydrocarbon-rich phase are predominately pentene-1. The actual purities of the extract and raffinate depend upon the efficiency of contact in the packed tower, and by varying the contacting conditions and/or the length of the packed contact tower, a better or poorer separation may be obtained as desired.

As various modifications of my invention are possible without passing beyond the spirit and scope thereof, my invention should not be restricted except as set forth in the appended claims.

I claim:

1. A process of effecting the separation of structurally isomeric close-boiling aliphatic olefins of differing degrees of branchedness from one another which comprises intimately contacting a liquid hydrocarbon mixture comprising said olefins with a selective solvent consisting essentially of liquid anhydrous ammonia under conditions such that two liquid phases exist and at a temperature substantially below the point of complete miscibility of said phases, one of said phases being an ammonia phase and the other being a hydrocarbon phase, and thereby effecting preferential dissolution of the more branched olefin content of said mixture in the ammonia phase, separating said phases, and recovering the olefins from the separated phases.

2. The process of claim 1 wherein said olefins comprise chiefly isobutylene and butene-1 and said isobutylene is preferentially dissolved in the ammonia phase.

3. The process of claim 1 wherein said olefins comprise chiefly 2-methyl-2-butene and pentene-2 and said 2-methyl-2-butene is preferentially dissolved in the ammonia phase.

4. The process of claim 1 wherein said olefins comprise chiefly 2-methyl-1-butene and pentent-1 and said 2-methyl-1-butene is preferentially dissolved in the ammonia phase.

5. The process of claim 1 wherein the ratio of said ammonia to said hydrocarbon mixture ranges from approximately 1 to 1 to approximately 10 to 1.

6. The process of claim 1 wherein said hydrocarbon mixture comprises chiefly said olefins.

7. The process of claim 1 wherein said hydrocarbon mixture comprises, in addition to said olefins, a hydrocarbon of substantially different boiling point from said olefins in amount sufficient to give the hydrocarbon phase a density substantially different from that of the ammonia phase and thereby aid materially in the separation of said phases.

8. The process of claim 1 wherein said hydrocarbon mixture comprises chiefly said olefins and a high-boiling hydrocarbon oil having a much higher boiling point than said olefins, said high-boiling oil being present in amount sufficient to give the hydrocarbon phase a density substantially above that of the ammonia phase and thereby aid materially in the separation of said phases.

CHARLES E. WELLING.